United States Patent [19]

Seki et al.

[11] Patent Number: 4,878,208
[45] Date of Patent: Oct. 31, 1989

[54] VOLTAGE-PHASE RESPONSIVE, INVERTER DISABLE CIRCUIT FOR SYSTEM INTERCONNECTION

[75] Inventors: Nagataka Seki; Kiyoshi Ogawa, both of Tokyo; Kihei Nakajima, Yokohama, all of Japan

[73] Assignee: Kabushiki Kaisha Toshiba, Kawasaki, Japan

[21] Appl. No.: 250,853

[22] Filed: Sep. 29, 1988

[30] Foreign Application Priority Data

Sep. 30, 1987 [JP] Japan .................................. 62-246143

[51] Int. Cl.$^4$ .............................................. H02J 3/06
[52] U.S. Cl. ........................................ 307/87; 307/45; 361/85; 323/207
[58] Field of Search ...................... 307/45, 46, 48, 86, 307/87; 323/207; 361/85

[56] References Cited

U.S. PATENT DOCUMENTS 3,909,621  9/1975  Nollace et al. .......................... 307/87
4,652,770  3/1987  Kumano ................................ 307/87
4,677,309  6/1987  Ogawa .................................. 307/87

OTHER PUBLICATIONS

SAND 85-7006, "Protecting Interconnections Between Photovoltaic Generations and Utility Distribution Lines," Electric Research & Management, Inc., Thomaston, ME 04861, Nov. 1985.

Primary Examiner—William H. Beha, Jr.
Attorney, Agent, or Firm—Oblon, Spivak, McClelland, Maier & Neustadt

[57] ABSTRACT

In a system interconnecting inverter apparatus, an inverter for controlling power of an AC power system is coupled, via a coupling reactor, to the AC power system having a system voltage. A system phase signal indicating the phase of the system voltage is detected by a system phase detection circuit in real time. Another phase signal indicating the phase of the system voltage is detected by a comparison phase detection circuit with a predetermined delay time, and the detection result is temporarily stored in the circuit as a comparison phase signal. The system phase signal and the comparison phase signal are phase-compared by a stop circuit. When a phase difference between the system phase signal and the comparison phase signal exceeds a predetermined value, the stop circuit stops the operation of the inverter.

11 Claims, 3 Drawing Sheets

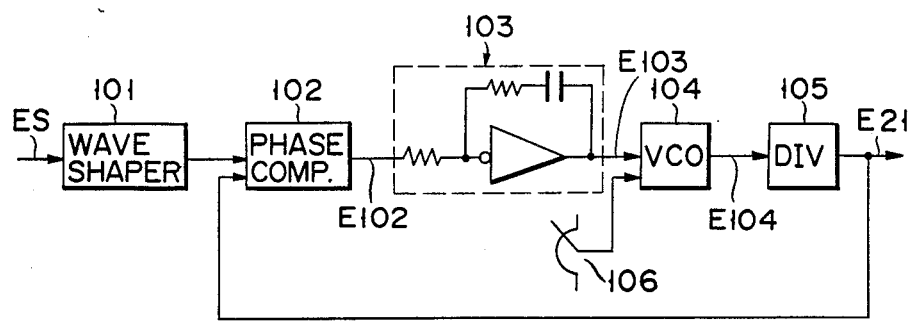
F I G. 2
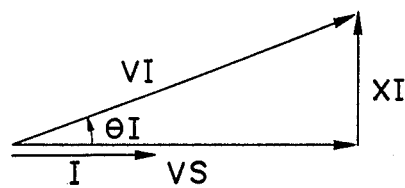
F I G. 3A
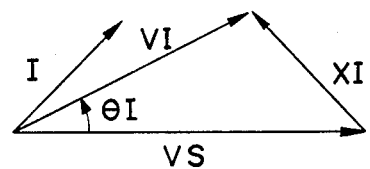
F I G. 3B

VOLTAGE-PHASE RESPONSIVE, INVERTER DISABLE CIRCUIT FOR SYSTEM INTERCONNECTION

BACKGROUND OF THE INVENTION

1. Field of the Invention

The present invention relates to protection of an inverter apparatus for system interconnection.

2. Description of the Related Art

A system for converting DC power such as a solar cell or a fuel cell into AC power using an inverter and connecting the converted power to a power source system through a coupling reactor or a transformer has become popular in view of effective use of energy. As described in Section 9.3 in "Semiconductor Power Conversion System", Institute of Electrical Engineers of Japan, the system coupling inverter is largely classified into a line-commutated type inverter for performing an inverter operation by utilizing an AC voltage and a self-commutated type inverter capable of desirably controlling an output voltage phase of an inverter. The self-commutated inverter can desirably supply delayed or advanced reactive power to an AC power system, and can be stably operated even if an AC power system capacity is small.

In a conventional self-commutated apparatus, an inverter outputs inverter voltage VI having phase $\theta I$ with respect to AC power system voltage Vs having phase $\theta s$, and controls reactive power and active power. FIGS. 3A and 3B show vector charts of the voltage and phase. FIG. 3A shows an operation state of power factor=1 wherein phases of system voltage Vs and output current I coincide with each other. FIG. 3B shows a case wherein current I advanced from system voltage Vs is supplied. Inverter voltage VI corresponds to a vector sum of system voltage Vs and voltage XI corresponding to a voltage drop across a coupling reactor whose phase is advanced by 90° from current I.

When the power factor is 1, as shown in FIG. 3A, Vs and I are in phase, and inverter phase $\theta I$ is advanced from a system voltage phase by a value substantially proportional to current I. When advanced current I shown in FIG. 3B is supplied, the magnitude of voltage VI can be decreased by reactive power corresponding to current I. In contrast to this, when delayed current I is supplied, voltage VI is increased. Therefore, active power can be controlled by changing $\theta I$, and reactive power can be controlled by controlling the magnitude of voltage VI.

With the above arrangement, a system coupling generator capable of controlling active and reactive powers can be realized.

In the conventional arrangement, when an AC circuit breaker is opened and a service interruption in an AC system occurs, the inverter is preferably stopped as soon as possible. In an inverter of this type, when a frequency or voltage is deviated from a standard value, an abnormal voltage or frequency detector operates to stop the inverter. (In this case, a load is present nearer to the inverter than the AC circuit breaker.) When the AC circuit breaker is opened, phase angle $\theta I$ defined by inverter output voltage VI and system voltage Vs is determined by the magnitude of the load. When inverter output active power is different from load active power before the AC circuit breaker is opened, $\theta I$ varies before and after circuit opening. A frequency changes by a value obtained by integrating the difference, and a change in frequency is detected as an abnormal frequency. As a result, the inverter is stopped.

When the inverter output reactive power is different from the load reactive power, the magnitude of system voltage Vs varies before and after the AC circuit breaker is opened, and reactive power also varies.

For these reasons, if system voltage Vs is decreased, inverter voltage reference VI* is decreased, and the inverter decreases output voltage VI in response to reference VI*. With this positive feedback operation, system voltage Vs is kept decreased, and an abnormal voltage of the inverter is then detected. As a result, the operation of the inverter is stopped.

In contrast to this, if system voltage Vs is increased, inverter voltage reference VI* is increased, and the inverter increases its output voltage VI in response to voltage reference VI*. As a result, system voltage Vs is further increased. In this case, the abnormal voltage of the inverter is detected as in a decrease in system voltage described above, and the operation of the inverter is stopped.

Both the active and reactive powers of the inverter output and the load are rarely the same. However, since an active power reference of the inverter changes along with time, the inverter is involved in one of the above two cases (abnormal frequency or voltage), and is stopped.

As described above, the frequency and voltage of the inverter are changed due to a service interruption, and the abnormal voltage or frequency detector detects this to stop the inverter. Time T from a service interruption to stop of the inverter is required to fall within the range of 0.5 to 1 sec although it is slightly different between Japan and U.S.A. In the conventional apparatus, the following problem is posed.

In order to shorten time T from a service interruption to stop of the inverter, detection sensitivity of the abnormal detector can be improved, or an operation time from detection to operation can be shortened. However, a change in system voltage is presumed to be ±5% in a normal state and often be about +10% or −15%. For example, an instantaneous decrease in system voltage upon power-on of a transformer or motor is experienced in a normal state. If the operation level of the abnormal voltage detector is set to fall within the range of +10% and −15%, and the operation time is set to fall within the range of 0.5 to 1 sec, the inverter may be stopped more frequently than needed. For the abnormal frequency detector, it is not preferable to set the detection level to fall within the range of ±1 Hz. The operation time of a commercially available abnormal frequency detector is 1 to 2 sec.

Assume that a variation range of the system frequency is 50 Hz ±1 Hz, and a frequency equal to or lower than 49 Hz and equal to or higher than 51 Hz is detected as an abnormal frequency. A service interruption occurs while the inverter is operated near 49 Hz, and the oscillation frequency of the inverter is gradually increased and reaches 51 Hz. Thereafter, the abnormal frequency detector is operated after the lapse of 1 sec, and the inverter is stopped. A time required for a variation of 2 Hz from 49 Hz to 51 Hz is about 5 sec under worst conditions. Time T from generation of abnormality to stop of the inverter must be a sum of a 2-Hz frequency change period (5 sec) and an operation time (1 sec) of the abnormal frequency detector, i.e., about 6 sec.

As described above, with the detection technique of the conventional apparatus, it is difficult to stop the inverter within 1 sec.

SUMMARY OF THE INVENTION

The present invention has been made in consideration of the above situation, and has as its object to provide an apparatus which can quickly stop an inverter when a circuit breaker of a power system is opened, and a service interruption occurs.

In order to achieve the above object, according to the present invention, a phase memory for sequentially storing a phase of an AC output voltage of an inverter is arranged. A service interruption is detected when a deviation between the stored phase and an actual voltage phase exceeds a predetermined value.

The phase stored in the phase memory normally coincides with the actual voltage phase. However, the coincidence cannot be established when a service interruption occurs. Assuming that the frequency of the inverter is changed by 0.5 Hz (half cycle), a phase is changed by 180° for 1 sec. If a phase shift exceeding 30° is considered as an abnormality, abnormality detection can be made, and the inverter can be stopped in 1/6 sec.

BRIEF DESCRIPTION OF THE DRAWING

FIG. 2 is a circuit diagram showing in detail phase memory 21 in FIG. 1;

FIGS. 3A and 3B are vector charts for explaining an operation of a system coupling inverter apparatus.

DESCRIPTION OF THE PREFERRED EMBODIMENTS

Figure 1:
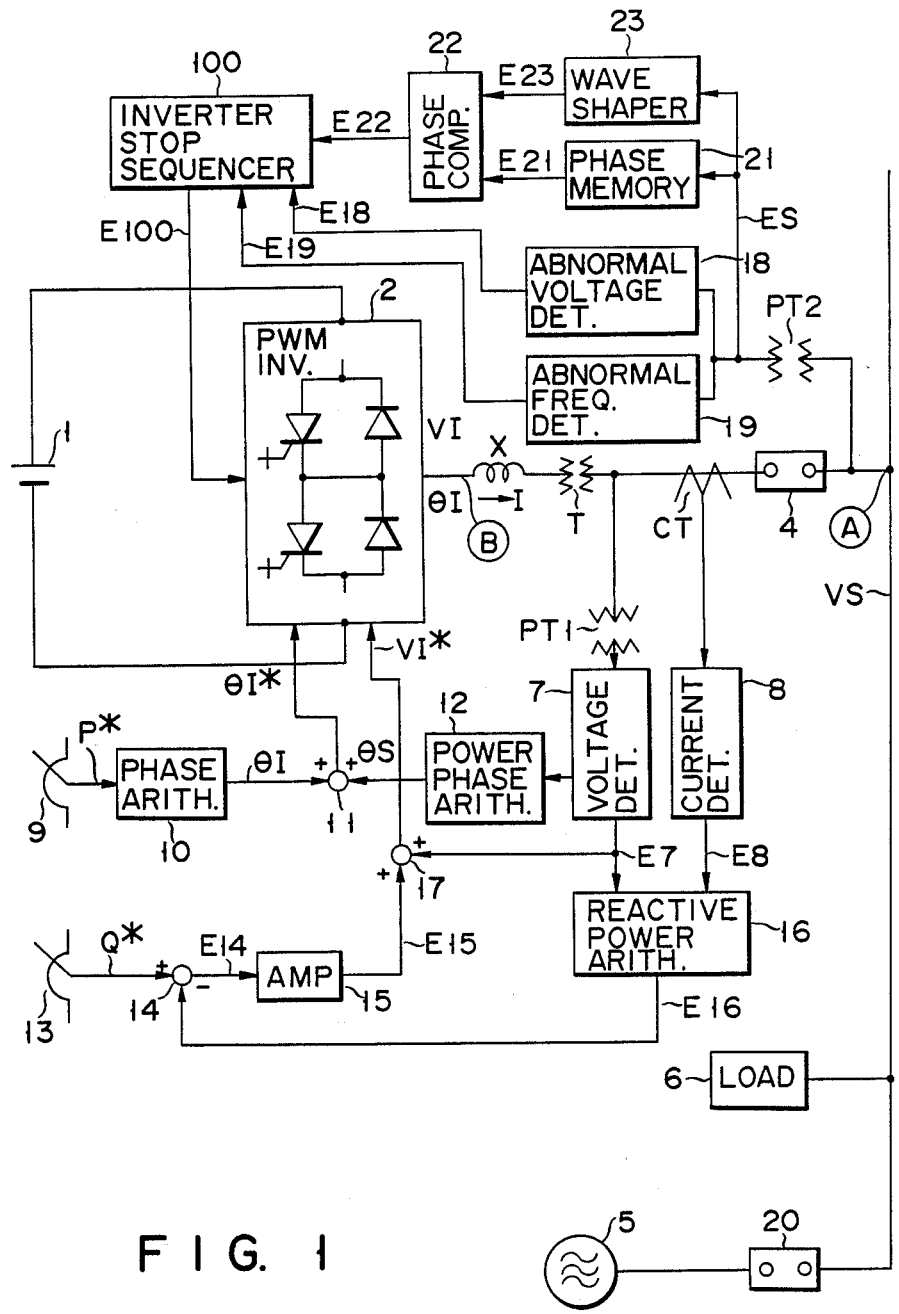
FIG. 1 is a block diagram showing an inverter apparatus according to an embodiment of the present invention.

FIG. 1 is a block diagram showing an embodiment of the present invention. In FIG. 1, reference numeral denotes a cell (DC power source); 2, a PWM inverter; X, a coupling reactor; 4 and 20, AC circuit breakers; 5, a power source; 6, a load; 7, a voltage detector; 8, a current detector; 9, an active power setter; 10, a phase arithmetic operator; 11, 14, and 17, adders; 12, a power source phase arithmetic operator; 13, a reactive power setter; 15, an amplifier; 16, a reactive power arithmetic operator; 18, an abnormal voltage detector; 19, an abnormal frequency detector; PT1 and PT2, potential transformers; and CT, a current transformer. Note that if transformer T is omitted, there is no difference in operation principle. Reference numeral 21 denotes a phase memory; 22, a phase comparator; and 23, a wave shaper. Output E22 from phase comparator 22 is input to inverter stop sequencer 100 together with output E18 from abnormal voltage detector 18 and output E19 from abnormal frequency detector 19. Sequencer 100 can be constituted by OR gates, and generates output E100 of logic "1" when one of outputs E18, E19, and E22 is at logic "1". When a firing pulse generator (not shown) in inverter 2 receives output E100 of logic "1", it stops supply of firing pulses to thyristors in inverter 2. Thus, the operation of inverter 2 is stopped.

In the arrangement of FIG. 1, active power reference P* is supplied from active power setter 9. Phase arithmetic operator 10 operates phase angle $\theta I = \tan^{-1}(X \cdot I/Vs)$ defined by system voltage Vs and $X \cdot I$ corresponding to a voltage drop across coupling reactor X for active current I. When $\theta I$ is small, $\theta I \simeq X \cdot I/Vs$. Since X and Vs are almost constant, a phase proportional to active current I can be supplied as $\theta I$. Phase $\theta I$ and phase $\theta s$ of the system voltage are added by adder 11, and the sum phase becomes output phase reference $\theta I^*$ of the inverter.

Figure 4:
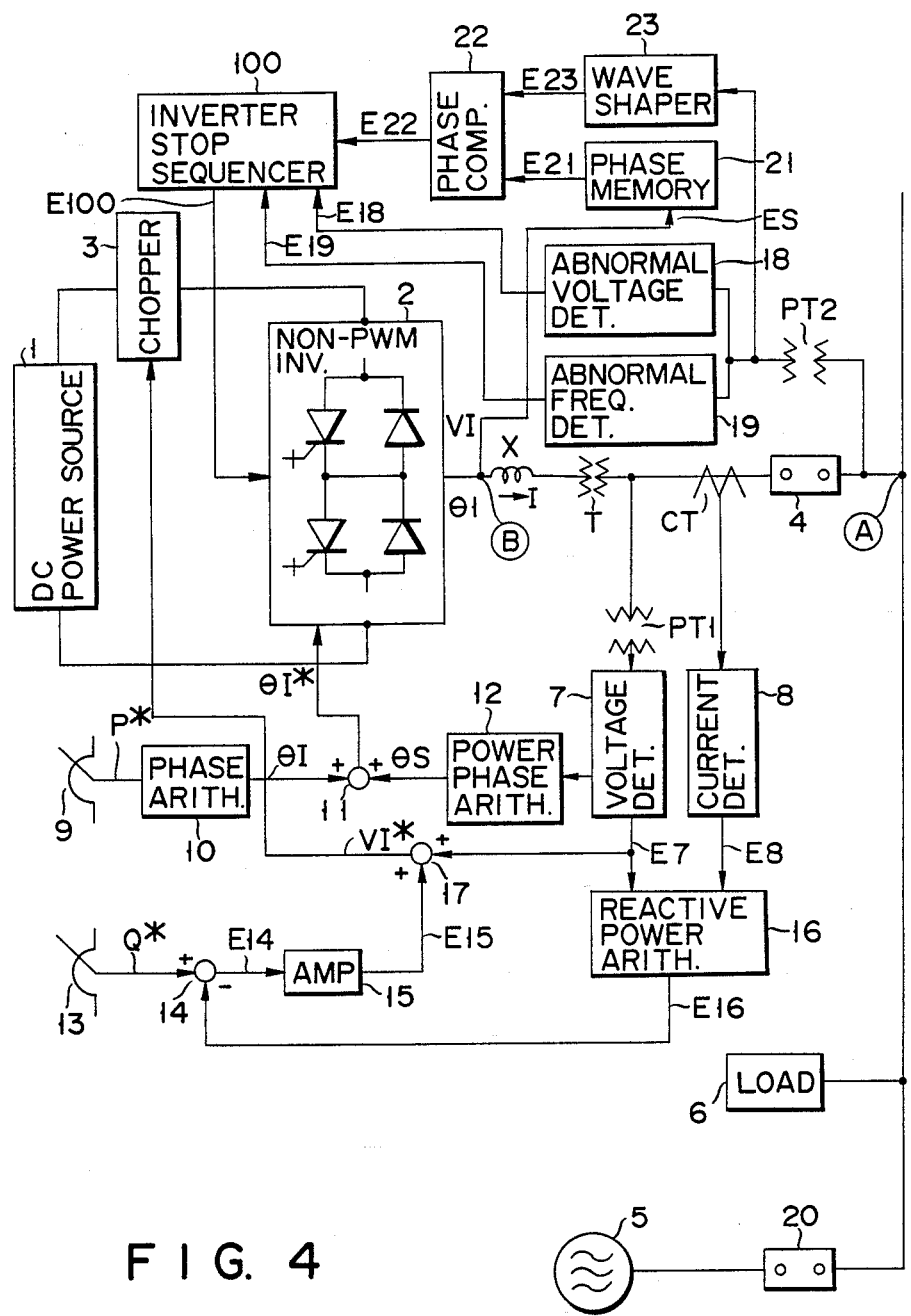
FIG. 4 is a block diagram showing an inverter apparatus according to another embodiment of the present invention.

Reactive power reference Q* is supplied from reactive power setter 13. Reactive power E16 operated by reactive power arithmetic operator 16 based on output E7 from voltage detector 7 and output E8 from current detector 8 is subtracted from value Q* to obtain deviation E14, and deviation E14 is amplified by amplifier 15. Amplified value E15 and output E7 representing the magnitude of system voltage Vs are added by adder 17 to determine the magnitude of output voltage reference VI* of the inverter. A means for changing the magnitude of inverter output voltage VI can be realized by changing a pulse width when inverter 2 is pulse-width modulation (PWM) controlled. When PWM control is not performed, as shown in FIG. 4, chopper 3 controlled by voltage reference VI* is arranged at the DC input side of non-PWM inverter 2 controlled by phase reference $\theta I^*$, thus adjusting the magnitude of the output voltage.

Phase memory 21 is a circuit for storing a given voltage phase at coupling point A at a time constant of 5 to 10 sec, and normally outputs square wave E21 phase-locked with system voltage Vs. Output E21 is input to one input of phase comparator 22 connected to memory 21. The other input of phase comparator 22 receives signal E23 which is obtained by converting voltage Vs at coupling point A into a square wave in a real-time manner by wave shaper 23.

Since two signals E21 and E23 supplied to phase comparator 22 are in phase in a normal state, output E22 from comparator 22 is logic "0". When AC circuit breaker 4 is opened, the frequency and phase of voltage Vs are changed as described above. More specifically, phase difference $\theta I$ between inverter voltage VI and system voltage Vs is controlled substantially in proportion to active power of the AC power system. If the impedance of coupling reactor X is assumed to be 0.3 (per unit), rated $\theta I = \tan^{-1}0.3 = 16.7°$. Thus, the variation range of $\theta I$ is 0° to at most 20°.

Assuming that AC circuit breaker 20 is opened or a service interruption of the AC power system occurs, $\theta I$ becomes an inherent value determined by the impedances of coupling reactor X and load 6. At this instance, output E21 from phase memory 21 and output E23 from wave shaper 23 have a large phase difference, ad output E22 from phase comparator 22 may go to logic "1". However, in many cases, a phase difference between E21 and EQ3 is small.

Assume that the frequency gradually varies and is increased. In this case, the phase is not immediately changed since there is a delay time of 5 to 10 sec in a response to input of output E21 from phase memory 21. Meanwhile, the phase of signal E23 representing the voltage phase at coupling point A is relatively advanced without a delay time in response. If the detection level of phase comparator 22 is ±10°, E22=logic "1". Thus, when the phase difference of E23 with respect to E21 exceeds 10°, sequencer 100 determines an abnormal frequency, and stops inverter 2.

FIG. 2 is a detailed circuit diagram of phase memory 21. Reference numeral 101 denotes a wave shaper for converting a sine wave into a square wave. Reference numeral 102 denotes a phase comparator; 103, an integrating amplifier; 104, a voltage controlled oscillator (VCO); 105, a frequency divider; and 106, a bias circuit. Components 102 to 105 constitute a known circuit, i.e., a Phase Locked Loop (PLL) circuit. If input Es and output E21 have a phase difference, phase comparator 102 generates output E102 corresponding to the phase difference. Integrating amplifier 103 integrates output E102 to output integral output E103. VCO 104 is an oscillator for generating frequency signal E104 proportional to input voltage E103, and its center frequency can be adjusted (preset) by bias circuit 106.

Unless output E102 from phase comparator 102 is "0", output E102 is integrated to change the oscillation frequency of VCO 104. Thus, phases of input Es and output E21 coincide with each other in a steady state. A response time is determined by an integrating time constant of integrating amplifier 103. Since the PLL circuit is available as a single IC, a detailed description thereof is omitted herein.

With the above operation, detection can be quickly made in response to a slow change in frequency upon a service interruption. That is, if a frequency is changed by 0.4 Hz in 1 sec, the conventional apparatus requires about 6 sec for detection, as described above. In contrast to this, since a phase difference in 1 sec corresponds to $360° \times 0.4 = 144°$, an abnormal frequency can be detected in $(10°/144° + t)$ sec using a detection level corresponding a shift of 10°. In this case, t is a time margin for preventing an erroneous operation. Although the phase of the system voltage is rarely changed by 10° or more, the system voltage waveform may often be disturbed upon turning-on of a power factor improving capacitor. Hence, t is about 0.1 sec although it depends on an installation place of the apparatus of this invention. Thus, $10°/144° + t$ is equal to or smaller than 0.2 sec, and a time from detection of a service interruption to stop of the inverter can be greatly shortened as compared to the conventional apparatus.

In the embodiment of FIG. 1, both first AC voltage E23 applied to one input of phase memory 21, and second AC voltage E21 applied to the other input of phase comparator 22 adopt Es corresponding to voltage Vs at coupling point A. However, detection points of first and second AC voltages E23 and E21 need not be the same. For example, as shown in FIG. 4, the detection point of second AC voltage E21 may be selected to be point B between inverter 2 and coupling reactor X. In this case, although θI is varied largely as compared to the case of FIG. 1, the detection level of phase comparator 22 can be widened to ±30° in consideration of this variation. The phase of voltage Vs at coupling point A is almost fixed, while voltage VI at the output point of inverter 2 changes depending on power control. Therefore, the detection point of first AC voltage E23 is preferably set near coupling point A between points A and B.

Note that in phase arithmetic operator 10, the voltage phase of the AC power system is preset. The phase of output voltage VI of inverter 2 and a firing phase of a power device (thyristor) constituting the inverter have a one-to-one correspondence. For this reason, if a signal of a logic circuit in a control circuit of inverter 2 (firing pulses of thyristors in inverter 2) is used without detecting a main circuit voltage (VI), the phase of second AC voltage E21 can be detected. In this case, this apparatus is economical since an interface section can be omitted.

In the above description, reference numeral 1 denotes a DC power source. In a system which is powered by another power source system, the output from a rectifier for converting AC power from another power source system into DC power can be considered as power source 1.

As described above, according to the present invention, a system service interruption can be quickly and reliably detected, and the inverter can be stopped. Thus, the present invention can meet a requirement of keeping safety of an AC power system.

What is claimed is:

1. A system interconnecting inverter apparatus comprising:
    an inverter, coupled to an AC power system having a system voltage, via a coupling reactor, for controlling power of said AC power;
    system phase detection means for detecting a system phase signal indicating a phase of the system voltage of said AC power system in real time;
    comparison phase detection means for detecting a signal indicating the phase of the system voltage of said AC power system with a predetermined delay time, and temporarily storing a result of the detection to provide a comparison phase signal; and
    stop means, coupled to said inverter, said system phase detection means, and said comparison phase detection means, for phase-comparing the system phase signal and the comparison phase signal and, when a phase difference between the system phase signal and the comparison phase signal exceeds a predetermined value, stopping the operation of said inverter.

2. An apparatus according to claim 1, wherein said system phase detection means includes means for detecting the phase of the phase signal which is substantially in-phase with the system voltage in real time, and outputting the system phase signal.

3. An apparatus according to claim 1, wherein said comparison phase detection means includes means for detecting a phase of the phase signal which is substantially in-phase with the system voltage of said AC power system in real time, and outputting the comparison phase signal.

4. An apparatus according to claim 1, wherein said comparison phase detection means includes means for detecting a phase of an output voltage of said invertor.

5. An apparatus according to claim 1, wherein said stop means includes:
    phase comparison means for outputting a first signal indicating a phase difference between the phase signal and the comparison phase signal;
    integrating means for integrating the first signal with a predetermined time constant, and outputting a second signal indicating the integration result; and
    signal generating means for outputting the comparison phase signal having a frequency corresponding to a signal level of the second signal.

6. An apparatus according to claim 5, wherein said stop means includes:
    means, coupled to said signal generating means, for adjusting the signal phase of the comparison phase signal independently of the signal level of the second signal.

7. An apparatus according to claim 1, wherein said inverter includes a PWM inverter which is operated in response to a predetermined phase reference and a predetermined voltage reference.

8. An apparatus according to claim 1, wherein said inverter includes:
   a non-PWM inverter which is operated in response to a predetermined phase reference; and
   means, responsive to a predetermined voltage reference, for controlling a DC input voltage to said non-PWM inverter.

9. An apparatus for coupling an inverter to a power system, via an AC circuit breaker and a coupling reactor, comprising:
   means for comparing a first phase signal, obtained by sequentially storing with a predetermined time constant a first AC voltage phase of a voltage of said power system, with a second phase signal, obtained by detecting a second AC voltage phase of the power system voltage in real time; and
   means for stopping said inverted when a result of the comparison of said comparing means exceeds a predetermined value.

10. An apparatus according to claim 9, wherein the first and second AC voltages are AC voltages obtained from optional detection points located between an inverter output and a coupling point of the inverter and the power system.

11. An apparatus according to claim 9, wherein: the first AC voltage is obtained from an output voltage of said inverter.

* * * * *